United States Patent
Bazata

(10) Patent No.: US 10,028,006 B2
(45) Date of Patent: Jul. 17, 2018

(54) TRANSPONDER LOSS AND JOIN-IN-PROGRESS CHANNEL MONITORING

(71) Applicant: EchoStar Technologies L.L.C., Englewood, CO (US)

(72) Inventor: Michael Bazata, Elizabeth, CO (US)

(73) Assignee: DISH Technologies L.L.C., Englewood, CO (US)

( * ) Notice: Subject to any disclaimer, the term of this patent is extended or adjusted under 35 U.S.C. 154(b) by 517 days.

(21) Appl. No.: 14/145,494

(22) Filed: Dec. 31, 2013

(65) Prior Publication Data

US 2015/0189376 A1    Jul. 2, 2015

(51) Int. Cl.
| | |
|---|---|
| H04N 7/173 | (2011.01) |
| H04N 21/426 | (2011.01) |
| H04N 21/2343 | (2011.01) |
| H04N 21/442 | (2011.01) |

(52) U.S. Cl.
CPC ... *H04N 21/4263* (2013.01); *H04N 21/23439* (2013.01); *H04N 21/234363* (2013.01); *H04N 21/4424* (2013.01)

(58) Field of Classification Search
CPC ........................ H04N 7/17318; H04N 7/17309
USPC ............................ 725/25, 32, 35, 74, 87, 111
See application file for complete search history.

(56) References Cited

U.S. PATENT DOCUMENTS

| | | | |
|---|---|---|---|
| 6,766,100 B1 * | 7/2004 | Komar | H04N 5/50 348/564 |
| 2008/0141317 A1 * | 6/2008 | Radloff et al. | 725/87 |
| 2013/0156130 A1 * | 6/2013 | Elkins et al. | 375/316 |

* cited by examiner

*Primary Examiner* — Jivka Rabovianski
(74) *Attorney, Agent, or Firm* — Bejin Bieneman PLC

(57) ABSTRACT

A set top box includes a first tuner configured to receive a first signal representing media content transmitted at a first resolution and a second tuner configured to receive a second signal representing the media content transmitted at a second resolution. A processing device is configured to monitor the second tuner to determine if the second tuner is receiving the second signal.

13 Claims, 2 Drawing Sheets

TRANSPONDER LOSS AND JOIN-IN-PROGRESS CHANNEL MONITORING

BACKGROUND

High-definition televisions can process and display media content at higher resolutions than standard-definition televisions can. Formats of high-definition television include 1080p, 1080i, and 720p. The suffix "p" indicates a progressive scanning while the suffix "i" indicates interlaced video. In progressive scanning implementations, the lines of each frame are drawn in sequence. With interlaced video, the frame is formed from two interlaced fields. One field is formed from the even rows and the other frame is formed from the odd rows.

DETAILED DESCRIPTION

An exemplary set top box includes a first tuner configured to receive a first signal representing media content transmitted at a first resolution and a second tuner configured to receive a second signal representing the media content transmitted at a second resolution. A processing device is configured to monitor the second tuner to determine if the second tuner is receiving the second signal. This way, a user can view a lower resolution version of the requested media content instance while a higher resolution version is temporarily unavailable.

The system shown in the FIGS. may take many different forms and include multiple and/or alternate components and facilities. While an exemplary system is shown, the exemplary components illustrated are not intended to be limiting. Indeed, additional or alternative components and/or implementations may be used.

Figure 1:
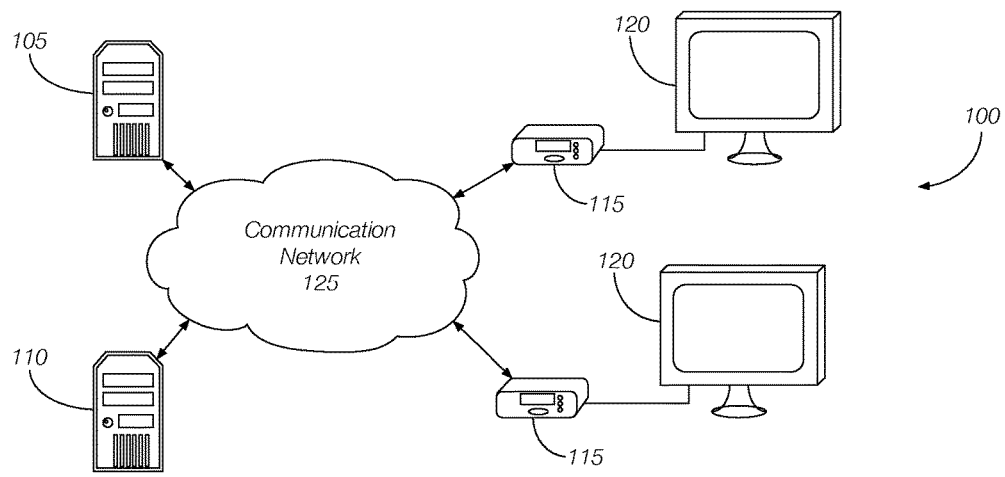
FIG. 1 illustrates an exemplary system providing media content according to different resolutions.

As illustrated in FIG. 1, the system 100 includes a first content server 105, a second content server 110, and multiple set top boxes 115, each connected to a display device 120. One or more components of the system 100 may communicate with one another over a communication network 125 such as one or more of a satellite network, a computer network, a telephone network, a cable television network, or the like. Only two content servers and set top boxes are shown for purposes of clarity and simplicity. The system 100 may include any number of content servers and/or set top boxes.

The first and second content servers 105, 110 may be configured to provide media content to one or more set top boxes 115 over the communication network 125 and in accordance with a particular resolution. Examples of media content may include television shows, movies, games, Internet content, or the like. In some possible implementations, the first and second content servers 105, 110 may provide the same instances of media content. The first content server 105, however, may transmit signals according to a standard-definition television protocol and the second content server 110 may transmit signals according to a high-definition television protocol. Thus, even though the signals may represent the same media content instance, the media content provided by the second content server 110 may have a higher resolution than the media content provided by the first content server 105.

Each set top box 115 may be configured to receive signals generated by the first content server 105, the second content server 110, or both. The set top box 115 may process the received signals and output the media content represented by the signals via the display device 120 connected to the set top box 115. Examples of display devices 120 may include televisions and computer monitors. The set top box 115 may be configured to receive a media content request made via a user input. If the media content is available at a higher resolution via, e.g., the second content server 110, the set top box 115 may be configured to display the higher resolution media content instance. If the media content is temporarily unavailable at a higher resolution, the set top box 115 may be configured to display the lower resolution media content instance received from, e.g., the first content server 105 while waiting for the higher resolution media content instance to become available. Once available, the set top box 115 may automatically switch to the higher resolution media content instance or present a message to the user via the display device 120 indicating that the higher resolution media content instance is now available.

In general, computing systems and/or devices, such as the first content server 105, the second content server 110, and the set top boxes 115, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

Figure 2:
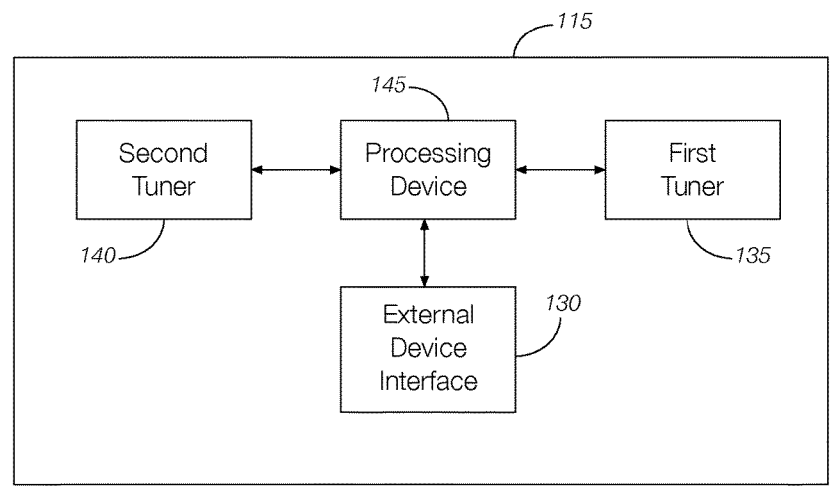
FIG. 2 illustrates an exemplary set top box that is configured to process signals representing media content with different resolutions.

FIG. 2 is a block diagram of an example set top box 115. The set top box 115 illustrated includes an external device interface 130, a first tuner 135, a second tuner 140, and a processing device 145.

The external device interface 130 may be configured to receive user inputs made via a remote control, for example. Moreover, the external device interface 130 may facilitate communication over the communication network 125 as well as provide signals to the display device 120. Thus, in one possible approach, the external device interface 130 may include an infrared receiver, a network interface device for communicating over the communication network 125, and an output interface device for communicating signals to the display device 120.

The first and second tuners 135, 140 may be configured to receive and process signals transmitted by one or both of the first and second content servers 105, 110. The first and second tuners 135, 140 may be configured to convert radio frequency signals into sounds and pictures for presentation on the display device 120. The first and second tuners 135, 140 may be configured to receive digital and/or analog signals. Moreover, the first and second tuners 135, 140 may be configured to receive and process signals representing media content having different resolutions. Thus, one or both of the first and second tuners 135, 140 may be configured to process both standard definition and high definition television signals transmitted from the first content server 105 and/or the second content server 110.

The processing device 145 may be configured to process signals received via the external device interface 130, the first tuner 135, and the second tuner 140. Moreover, the processing device 145 may be configured to receive requests, via a user input, for particular media content instances and to request media content instances from the first content server 105, the second content server 110, or both. In some implementations, the processing device 145 may be configured to request a higher resolution version of the media content instance, if available, to be provided by the second content server 110 to the second tuner 140.

In some implementations, the processing device 145 may selectively enable the first tuner 135 or the second tuner 140 to output signals representing media content to the display device 120, depending on, e.g., whether the higher resolution version is available. If the higher resolution version of the media content instance is temporarily unavailable, the processing device 145 may be configured to request the lower resolution version of the media content instance from the first content server 105. The lower resolution version of the media content instance may be received at the first tuner 135 and output to the display device 120 via the external device interface 130. Thus, the first tuner 135 may be enabled until the higher resolution version of the media content instance becomes available.

While presenting the lower resolution version of the media content instance, the processing device 145 may monitor the signals received by the second tuner 140 to determine if the higher resolution version of the media content instance has since become available. One way for the processing device 145 to determine that the higher resolution version of the media content instance has become available is based on the signal strength of the signals received by the second tuner 140. If the signal strength of the signals received by the second tuner 140 exceeds a predetermined threshold for a predetermined amount of time, the processing device 145 may determine that the second tuner 140 is receiving the higher resolution version of the media content instance. Alternatively, the processing device 145 may monitor a channel mapping table in the transport stream to determine whether the higher resolution version of the media content instance is available. Once the higher resolution version has become or is determined to be available, the processing device 145 may be configured to automatically enable the second tuner 140 to, e.g., cause the higher resolution version of the media content instance to be displayed on the display device 120. Alternatively, the processing device 145 may generate a notification, indicating that the higher resolution version is available, to be presented to the user via the display device 120. The notification may prompt the user to either continue to watch the lower resolution version of the media content instance on the first tuner 135 or switch to the higher resolution version on the second tuner 140. If the user elects to watch the higher resolution version of the media content, the processing device 145 may enable the second tuner 140 to output the higher resolution version to the display device 120.

Figure 3:
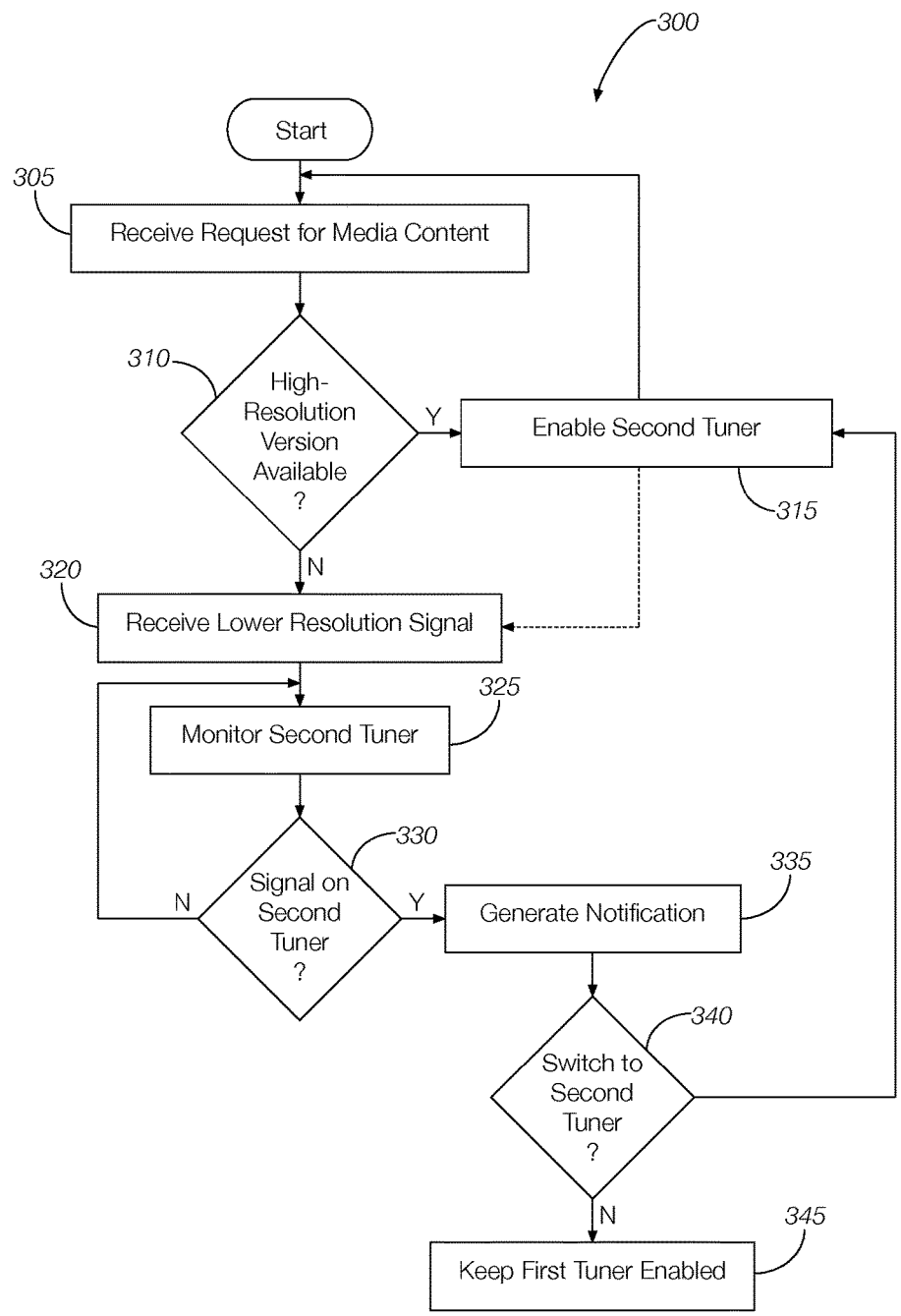
FIG. 3 is a flowchart of an exemplary process that may be used to process media content according to different resolutions.

FIG. 3 is a flowchart of an exemplary process 300 that may be implemented by one or more components of the system 100 of FIG. 1. For instance, the process 300 may be executed by the processing device 145.

At decision block 305, the processing device 145 may receive a request for media content. The request may be received at the set top box 115 by the external device interface 130, which may transmit the request to the processing device 145. The external device interface 130 may receive the request via a user input provided by, e.g., a remote control.

At decision block 310, the processing device 145 may determine whether a high-resolution version of the requested media content is available. For example, the processing device 145 may request the media content from a server capable of transmitting high-resolution media content, such as the second content server 110 discussed above. The processing device 145 may request that the high-resolution media content be provided to the second tuner 140. The processing device 145 may determine whether the high-resolution version of the media content is available based on the signal strength of the signal received by the second tuner 140 or based on the contents of a channel mapping table. If the signal strength meets or exceeds a predetermined threshold, or if the channel map indicates that the higher resolution version of the media content instance is available, the processing device 145 may conclude that the high-resolution version is available for presentation, and the process 300 may continue at block 315. If the signal strength is below the predetermined threshold, the processing device 145 may conclude that the high-resolution version is at least temporarily unavailable, and the process 300 may continue at block 320.

At block 315, the processing device 145 may enable the second tuner 140. That is, the processing device 145 may cause the second tuner 140 to output to the display device 120 so that the higher resolution version of the media content may be presented to a user. In some instances, the process 300 may end after block 315. Alternatively, the process 300 may return to block 305 to wait for another request for media content, or in some instances, the process 300 may continue at block 320 if rain fade, as evidenced by a low signal strength, occurs during presentation of the higher resolution media content instance.

At block 320, the processing device 145 may receive, from a server capable of transmitting lower resolution media content, such as the first content server 105, the lower resolution version of the media content requested at block 305. The lower resolution version of the media content may be received at the set top box 115 by, e.g., the first tuner 135. Moreover, at block 320, the processing device 145 may enable the first tuner 135 to output the received signal to the display device 120 so that the user may view a lower resolution version of the requested media content instance while the higher resolution version is temporarily unavailable.

At block 325, the processing device 145 may monitor the second tuner 140 to determine whether the second tuner 140 is receiving a signal with the higher resolution version of the requested media content. Monitoring the second tuner 140 may include monitoring the signal strength of signals received at the second tuner 140 and/or the contents of the channel mapping table.

At decision block 330, the processing device 145 may determine whether a signal is present on the second tuner 140. The presence of a signal on the second tuner 140 may indicate that the higher resolution version of the requested media content has become available. The processing device 145 may determine that the signal is present if the signal strength exceeds a predetermined threshold. In some instances, the processing device 145 may determine that the signal is present if the signal strength exceeds the predetermined threshold for a predetermined amount of time or if the channel mapping table has changed. If the processing device 145 determines that the signal is present, the process 300 may continue at block 335. If no signal is present on the second tuner 140, or if the signal is below the predetermined threshold for less than the predetermined amount of time, the process 300 may return to block 325 so that the second tuner 140 may continue to be monitored.

At block 335, the processing device 145 may generate a notification indicating that the higher resolution version of the requested media content is available on the second tuner 140. The notification may further prompt the user to select whether to switch to the second tuner 140. Switching to the second tuner 140 may cause the second tuner 140 to output the higher resolution version of the media content to the display device 120.

At block 340, the processing device 145 may determine whether the user has elected to switch to the second tuner 140. If so, the process 300 may continue at block 315 so that the second tuner 140 may be enabled. If no user input is received, or if the user declines to switch the output of the set top box 115 to the second tuner 140, the process 300 may continue at block 345.

At block 345, the processing device 145 may keep the first tuner 135 enabled so that the lower quality version of the media content remains visible to the user. The process 300 may end after block 345, or alternatively, the process 300 may return to block 305 to wait for another request for media content from the user.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:
1. A set top box comprising:
a first tuner configured to receive a first signal representing media content transmitted at a first resolution;
a second tuner configured to receive a second signal representing the media content transmitted at a second resolution higher than the first resolution; and a processing device configured to receive a user input requesting the media content, select the first tuner to temporarily output the requested media content at the first resolution in response to the user input, and, while the first tuner is outputting the requested media content at the first resolution, compare a signal strength of the second signal to a predetermined threshold and select the second tuner to output the requested media content at the second resolution as a result of determining that the second tuner is receiving the second signal at the second signal strength greater than the predetermined threshold, wherein the user input requests the media content at the second resolution.

2. The set top box of claim 1, wherein the processing device is configured to generate a notification indicating that the second tuner is receiving the second signal.

3. The set top box of claim 1, further comprising a display device, and wherein the processing device is configured to selectively enable one of the first tuner and the second tuner to output the first signal and the second signal, respectively, to the display device.

4. The set top box of claim 3, wherein the processing device is configured to activate the first tuner to output the first signal to the display device until the processing device determines that the second tuner is receiving the second signal at the signal strength greater than the predetermined threshold.

5. The set top box of claim 1, wherein the processing device is configured to determine that the second tuner is receiving the second signal based on the signal strength of the second signal exceeding the predetermined threshold for a predetermined amount of time.

6. The set top box of claim 1, wherein the processing device is configured to activate the second tuner in response to a user input selecting the second tuner after the processing device selects the second tuner to output the requested media content.

7. A method comprising:
receiving a user input requesting media content;
receiving, via a first tuner, a first signal representing the requested media content transmitted at a first resolution;
selecting the first tuner to temporarily output the requested media content at the first resolution;
comparing a signal strength of a second signal received at a second tuner to a predetermined threshold;
determining that the signal strength of the second signal is greater than the predetermined threshold;
determining that the second tuner is receiving the second signal as a result of determining that the signal strength of the second signal is greater than the predetermined threshold;
selecting, via a processing device, the second tuner to output the requested media content at the second resolution as a result of determining that the second tuner is receiving the second signal at the signal strength greater than the predetermined threshold, wherein the user input includes a request for the media content at the second resolution; and
generating a notification indicating that the second tuner is receiving the second signal.

8. The method of claim 7, further comprising selectively activating one of the first tuner and the second tuner to output the first signal and the second signal, respectively, to a display device.

9. The method of claim 8, wherein the first tuner is activated to output the first signal to the display device until the second tuner receives the second signal at a signal strength greater than the predetermined threshold.

10. The method of claim 8, wherein the second tuner is activated to output the second signal to the display device as a result of determining that the second tuner is receiving the second signal at the signal strength greater than the predetermined threshold.

11. The method of claim 7, wherein the second tuner is activated as a result of determining that the signal strength of the second signal exceeds the predetermined threshold for a predetermined amount of time.

12. The method of claim 7, further comprising activating the second tuner in response to a user input selecting the second tuner after the processing device selects the second tuner to output the requested media content at the second resolution.

13. A system comprising:
a first server configured to transmit a first signal representing media content having a first resolution;
a second server configured to transmit a second signal representing the media content having a second resolution higher than the first resolution; and
a set top box having a first tuner and a second tuner, wherein the set top box is configured to receive a request for the media content at the second resolution from a user input, and selectively activate one of the first tuner and the second tuner to provide the requested media content based on whether the second tuner is receiving the second signal,
wherein the set top box is programmed to activate the first tuner to temporarily output the requested media content at the first resolution, and while the first tuner is outputting the requested media content at the first resolution, the set top box is programmed to compare a signal strength of the second signal to a predetermined threshold and select the second tuner to output the requested media content at the second resolution as a result of determining that the second tuner is receiving the second signal at the second signal strength greater than the predetermined threshold.

* * * * *